3,567,692
POLYMERIC MATERIALS PRODUCED BY INTERACTING POLYISOCYANATE AND WATER IN THE PRESENCE OF POLYALDIMINE OR POLYKETIMINE
Geoffrey Arthur Haggis, Ronald Wynford Kenyon, and Vincent Kerrigan, Manchester, England, assignors to Imperial Chemical Industries Limited, London, England
No Drawing. Original application Jan. 29, 1964, Ser. No. 341,114, now Patent No. 3,420,800, dated Jan. 7, 1969. Divided and this application Mar. 26, 1968, Ser. No. 716,706
Claims priority, application Great Britain, Feb. 4, 1963, 4,507/63; Aug. 29, 1963, 34,223/63
Int. Cl. C08g 22/00
U.S. Cl. 260—75                                  11 Claims

ABSTRACT OF THE DISCLOSURE

A process for the manufacture of isocyanate-based polymers which comprises interacting at least one organic polyisocyanate and water in the presence of a sterically hindered bisaldimine or bisketimine derived from an amine containing two primary amino groups. The solutions of isocyanates containing such bisaldimines or bisketimines are significantly more stable than similar solutions containing other aldimines or ketimines. This increased stability is obtained without any significant decrease in the speed of polymer formation in presence of water or loss of desirable properties in the polymers, for example, surface coatings, so obtained.

---

This is a division of United States application Ser. No. 341,114 filed Jan. 29, 1964, now U.S. Pat. No. 3,420,800.

This invention relates to the manufacture of polymers, and more particularly to the manufacture of polymers by the interaction of polyisocyanates, water and sterically hindered bisaldimines or bisketimines.

Polymers derived from polyisocyanates are valuable in many applications such as plastics, rigid or flexible foams, rubbers and surface coatings. For this last application one procedure consists in applying a solution of polyisocyanates, at least in part of a polymeric nature such as may be obtained by interaction of polyesters with excess of diisocyanates, to the article which is to be coated and exposing the coating to the atmosphere. The coating absorbs water from the atmosphere which serves to polymerise further and crosslink the polyisocyanate. This procedure has the disadvantage that the reaction with water, and consequently the drying of the surface coating, tends to be slow. The addition of catalysts or of compounds containing active hydrogen atoms such as diamines will increase the drying speed but causes undesirable storage instability of the solution to be used for preparing the coating. Other polyurethanes, in particular rubbers often present similar difficulties in respect of cure by reaction with absorbed water or with added diamine.

It has now been discovered that sterically hindered bisaldimines or bisketimines derived from amines containing two primary amino groups may be added to polyisocyanates, preferably dissolved in inert solvents, to give solutions which are stable for periods up to several weeks, but that such solutions on treatment with water or exposure to the atmosphere rapidly produce a cross-linked polymer and may be used to provide a rapid-drying surface coating of excellent physical properties.

The utility of the invention is not confined to the preparation of surface coatings. Polymers of a wide range of properties and suitable for application as plastics, foams, or rubbers may also be obtained, omitting solvents as appropriate, from suitable polyisocyanates, bisaldimines or bisketimines and water.

According to the invention therefore there is provided a process for the manufacture of isocyanate-based polymers which comprises interacting at least one organic polyisocyanate and water in the presence of a sterically hindered bisaldimine or bisketimine derived from an amine containing two primary amino groups.

Examples of suitable organic polyisocyanates include aliphatic diisocyanates such as hexamethylene diisocyanate and tetramethylene diisocyanate, aromatic diisocyanates such as tolylene-2:4-diisocyanate, tolylene-2:6-diisocyanate, diphenylmethane - 4:4' - diisocyanate, 3-methyldiphenylmethane-4:4'-diisocyanate, m- and p-phenylene diisocyanate, chlorophenylene - 2:4 - diisocyanate, naphthalene-1:5-diisocyanate, diphenyl-4:4'-diisocyanate, 4:4'-diisocyanato-3:3'-di-methyldiphenyl and diphenyl ether diisocyanate and cycloaliphatic diisocyanates such as di-cyclohexylmethane diisocyanate and methylcyclohexylene diisocyanates. Triisocyanates which may be used include aromatic triisocyanates such as 2:4:6-triisocyanatotoluene and 2:4:4'-triisocyanatodiphenyl ether. Examples of other suitable organic polyisocyanates include the reaction products of an excess of a diisocyanate with polyhydric alcohols such as trimethylolpropane, uretedione dimers and isocyanurate polymers of diisocyanates for example of tolylene-2:4-diisocyanate, and biuret polyisocyanates obtained by reaction of polyisocyanates with water. Mixtures of polyisocyanates may be used. Examples of suitable mixtures include the polyisocyanate compositions obtained by the phosgenation of the mixed polyamine reaction products of formaldehyde and aromatic amines such as aniline and orthotoluidine.

It is however preferred to use isocyanate-ended prepolymers obtained by the interaction of excess of a polyisocyanate as described above with a glycol or other polyhydric alcohol, polyester, polyesteramide or polyether. Such polymers may contain allophanate groups derived from reaction of polyurethane groups with further isocyanate groups. For the preparation of surface coatings and rigid foams it is preferred that the prepolymer should contain a relatively high degree of branching, introduced by use of polyisocyanates or isocyanate-reactive components of functionality greater than two. For the preparation of rubbers or flexible foams essentially linear prepolymers are preferred being obtained by use of diisocyanates in combination with glycols or difunctional polyesters, polyesteramides or polyethers.

Preferably, in order to avoid any toxicity hazard and deposits of insoluble polymers, any unreacted diisocyanate present in the prepolymer should be removed, for example by distillation or solvent treatment.

As examples of polyethers from which the prepolymers may be prepared there may be mentioned oxypropylated derivatives of glycerol, diethylene glycol, trimethylolpropane, and sorbitol. As examples of polyesters there are polydiethylene adipate, polyethylene/propylene adipate, and branched polyesters based on hexanetriol/adipic acid/phthalic acid. For use in prepolymers of value in surface coatings polyethers or polyesters of molecular weight between 250 and 2000 are preferred, although compounds of lower or higher molecular weight may be used if desired. Polyethers or polyesters of higher molecular weight are preferred in prepolymers for the preparation of rubbers or flexible foams.

The process of the present invention is of particular advantage when the polyisocyanate contains at least in part isocyanate groups bound to aliphatic or cycloaliphtaic carbon atoms since such isocyanates are of low reactivity leading to slow reaction in absence of a catalyst or of the bisaldimines or bisketimines of the present invention. These polyisocyanates have advantages over aromatic polyisocyanates in that the mixtures with bisaldimine or bisketimine are much more stable to storage and the polymers obtained from them are less discoloured by light.

The bisaldimines or bisketimines used in the present invention are those derived from certain sterically hindered amines or sterically hindered aldehydes or ketones, and may be obtained from these ingredients by known methods, for example by heating in an inert organic solvent with removal of water as it is formed.

The solutions of isocyanates containing such bisaldimines or bisketimines are significantly more stable than similar solutions containing other aldimines or ketimines. This increased stability is obtained without any significant decrease in the speed of polymer formation in presence of water or loss of desirable properties in the polymers, for example surface coatings, so obtained. The bisaldimines or bisketimines may contain in addition a group reactive to isocyanate, for example hydroxyl or imino, so that the aldimine or ketimine will react with the polyisocyanate in absence of water without further polymerisation.

Amines containing two primary amino groups from which the aldimines or ketimines may be obtained include ethylene diamine, propylene diamine, hexamethylenediamine, diaminocyclohexanes, m- or p-xylylenediamines diethylenetriamine, m- or p-phenylene diamine, tolylene-2:4- or 2:6 diamines, diaminodiphenylmethanes, di-$\beta$-aminoethylsulphide, di-$\beta$-aminoethyldisulphide, di-$\beta$-aminoethylether, di-$\gamma$-amino-n-propylether, triglycoldiamine, polymers of alkylene oxides such as ethylene oxide in which the terminal hydroxyl groups are replaced by amino groups, 1:3-diaminopropan-2-ol, $\omega$:$\omega$'-diamino-di-n-hexylamine and dimethyl-2:4-diaminoadipate. The preferred amines are aliphatic or cycloaliphatic amines, since these compounds do not give rise to discolouration in the derived polymer.

Aldehydes or ketones which may be used in preparation of the aldimines or ketimines include acetaldehyde, propionaldehyde, n-butyraldehyde isobutyraldehyde, 2-ethylbutyraldehyde, valeraldehyde, isopentaldehyde, 2-methylpentaldehydes, 2-ethylhexaldehydes, acrolein, methacrolein, crotonaldehyde, furfural, pyruvic aldehyde, acrolein dimer, methacrolein dimer, 1:2:3:6-tetrahydrobenzaldehyde, 6-methyl-3-cyclohexene aldehyde, cyanoacetaldehyde, glyoxylic acid ethyl ester, benzaldehyde, acetone, methylisobutylketone, diethylketone, methylethylketone, methylpropylketone, methyl-n-amylketone, diisobutylketone, mesityl oxide, 2-acetylfuran, 4-methoxy-4-methylpentan-2-one, cyclohexanone, and acetophenone. It is however desirable that the aldehyde or ketone have a boiling point below about 180° C. so that it is readily lost from the polymer during the curing stage. Aldimines are in general preferred to ketimines since they have less tendency to interact with polyisocyanates in absence of water.

By sterically hindered amines, aldehydes or ketones are meant those amines, aldehydes or ketones which contain amino or carbonyl groups attached directly to a carbon atom which is attached directly to three other carbon atoms.

As examples of sterically hindered amines from which bisaldimines or bisketimines suitable for use in the process of the invention may be prepared by condensation with aldehydes or ketones in general there may be mentioned 1:8-methane diamine, 2:3-diamino-2:3-dimethyl butane, 2:4 - diamino - 2:3 - dimthylpentane, 1:3-diamine-1-methylcyclohexane, and 1:6-diamino-1:1-dimethylhexane.

As examples of sterically hindered aldehydes and ketones from which bisaldimines and bisketimines suitable for use in the process of the invention may be prepared by condensation with amines in general there may be mentioned trimethylacetaldehyde (pivalic aldehyde), dimethylethylacetaldehyde, methyldiethylacetaldehyde, 1-methylhexahydrobenzaldehyde, and methyl-t-butylketone.

In general it is preferred on the grounds of increased stability of the polyisocyanate solutions containing them to use bialdimines of bisketimines in which the aldehyde or ketone group, and optionally also one or more of the amino groups is sterically hindered rather than those in which one or more of the amino groups only are sterically hindered.

The process of the invention may be carried out by any conventional procedure for the manufacture of polymeric materials from polyisocyanates, and the choice of conditions, the preferred ingredients and the relative proportions of these will depend upon the type of polymer required. In general however it is preferred that the amount of bisaldimine or bisketimine be such that about one aldimine or ketimine group is present for every isocyanate group after allowing for any other isocyanate reactive group present.

The amount of water to be added will depend upon the type of polymer required and whether it is desired to utilize water absorbed from the air. In the case of surface coatings which will dry in an atmosphere containing moisture it is not necessary to add water at all. In general however the amount of water added should not be greater than that required to react with the free isocyanate groups present.

In the manufacture of surface coatings the polyisocyanate may for example be dissolved in an inert organic solvent such as toluene, xylene, 2-ethoxyethyl acetate, butyl acetate, or methyl isobutyl ketone and the bisaldimine or bisketimine is added to this solution. It is, however, desirable to avoid the use of solvents containing carbonyl groups as these may affect the storage stability of such solutions. The solution, which is storage stable for a sufficient time is then used to coat the chosen substrate by any known method such as brushing, dipping or spraying, and the coating allowed to dry in the air at room temperature or at a temperature up to 100° C., or higher if desired. Suitable substrates include rubbers, paper, wood, leather, metals, glass, plastics such as polyvinyl chloride, and textiles of natural, artificial or synthetic materials.

In the case of plastics, foams, and rubbers the polyisocyanates, bisaldimines or bis-ketimines and any other ingredients may be mixed, usually in absence of a solvent, shaped if necessary, for example in the case of rubbers into thread form, and then cured at room temperature or by heating at up to 100° C., any necessary water being added during and preferably near to the end of the mixing stage. Water from the atmosphere may participate in at least a part of the cure, but this is not generally effective except in cases where the shaped polymer is thin and has a substantial part of its surface area exposed to the atmosphere. In the case of foamed products the gas necessary for foaming may be produced for example by the action of polyisocyanate or water, which may be used in excess over the stoichiometric quantity of bisaldimine or bis-ketimine, or by the addition of volatile substances such as trichlorofluoromethane, dichlorodifluoromethane, methylene dichloride, or ethyl chloride.

Other polymer forming ingredients may also be present in the process of this invention, for example polyhydric alcohols, polyesters, polyethers, polyesteramides, aminoalcohols and polyamines, but such ingredients will tend to reduce the storage stability of the polymer-forming mixture.

Other ingredients, which do not participate essentially in the polymer-forming reaction, may also be present, for for example pigments, fillers, flame-proofing agents, surface active materials, and antioxidants.

The invention is illustrated but not limited by the following examples in which all parts and percentages are by weight unless otherwise stated.

Example 1

Lacquer compositions are prepared by adding the bisaldimines listed below to mixtures of 4.5 parts of butyl acetate and 5 parts of a 75% solution in ethyl acetate of a condensate of trimethylol propane, butylene glycol and an 80:20 mixture of 2:4- and 2:6-tolylenediisocyanates, such solution containing 12.7% of isocyanate groups and less than 0.5% of free tolylenediisocyanates.

| Composition | Components of bisaldimines | Amount of bisaldimine, parts |
|---|---|---|
| A | 1:8-p-menthanediamine/isobutyraldehyde | 2.1 |
| B | 1:8-p-menthanediamine/trimethylacetaldehyde (pivalic aldehyde). | 2.3 |
| C | Hexamethylenediamine/trimethylacetaldehyde (pivalic aldehyde). | 1.9 |
| D | Hexamethylenediamine/isobutyraldehyde | 1.7 |

The lacquer compositions are cast on to white porcelain tiles and all afforded hard tack-free films within 30 minutes of exposure to the atmosphere at room temperature (23.5° C.) at relative humidity 48%–54%. The lacquer compositions were stored in glass containers out of contact with air. Composition D gelled in 4 hours and composition A in 11 hours, but compositions B and C were still free from gelation after 7 weeks.

Example 2

Lacquer compositions are prepared by adding the bisaldimines listed below to 5 parts of an isocyanate-ended polymer having an isocyanate group content of 7.1% prepared from hexamethylene diisocyanate and a polyhexane triol/1,3-butylene glycol adipate containing 4.6% of hydroxyl groups, and sufficient dry butyl acetate to give a solution of 50% solids content.

| Composition | Components of bisaldimine | Amount of bisaldimine | Amount of butyl acetate |
|---|---|---|---|
| E | Hexamethylene diamine/isobutyraldehyde. | 0.95 | 5.95 |
| F | Hexamethylene diamine/trimethylacetaldehyde. | 1.06 | 6.06 |
| G | 1:8-p-menthanediamine/isobutyraldehyde. | 1.17 | 6.17 |
| H | 1:8-p-menthanediamine/trimethylacetaldehyde. | 1.29 | 6.29 |

The compositions afforded on white porcelain tiles at 27.5° C. and 54% relative humidity hard tack-free films within 35 minutes in cases of compositions E, F and G and within 5 hours in the case of H. On storage composition E gelled after 32 days and composition G after 12 weeks, but compositions F and H were free from gelation after 14 weeks.

Example 3

Lacquer compositions are obtained by adding the bisaldimines listed below to 8.0 parts of a 75% butyl acetate solution containing 2.6% of isocyanate groups of an isocyanate-ended polymer prepared from 2:4-tolylenediisocyanate and polyethylene/propylene adipate of hydroxyl content 3.66% together with sufficient butyl acetate to make a 50% solution.

| Composition | Components of bisaldimine | Amount of bisaldimine | Amount of butyl acetate |
|---|---|---|---|
| I | Hexamethylene-diamine/isobutyraldehyde. | 0.55 | 4.55 |
| J | Hexamethylene-diamine/trimethylacetaldehyde. | 0.62 | 4.62 |

The compositions afforded on white porcelain tiles hard tack-free films in 30 minutes. On storage composition I gels in 2 days but composition J is free from gelation after 14 weeks.

Example 4

Lacquer compositions are obtained by adding the bisketimines listed below to 5 parts of an isocyanate-ended polymer prepared from hexamethylenediisocyanate and polyhexanetriol/1:3-butylene glycol adipate having a hydroxyl content of 4.6% together with sufficient butyl acetate to make a solution of 50% strength.

| Composition | Components of bisketimine | Amount of bisketimine | Amount of butyl acetate |
|---|---|---|---|
| K | m-Xylylenediamine/methylisobutylketone. | 1.27 | 6.27 |
| L | m-Xylylenediamine/methyl t-butylketone. | 1.27 | 6.27 |

Both lacquer compositions afford hard tack-free films within one hour. On storage composition K gels within 40 hours, but composition L is gel-free after 7 weeks.

Preparation of sterically hindered bis-aldimines and bisketimines bisaldimine from 1,2-p-menthanediamine and isobutyraldehyde.—42.4 parts of isobutyraldehyde are added with stirring over 30 minutes to a solution of 50 parts 1:8-p-menthane diamine in 121.2 parts of toluene, the temperature being allowed to rise to 32° C. but not higher. After a further 30 minutes standing the mixture is cooled to below 20° C. and the water (9.5 parts) formed in the reaction is separated off. The reaction mixture is then distilled under reduced pressure to remove the toluene and then gives the bis-aldimine from 1,8-p-menthane diamine and isobutyraldehyde, boiling between 98 and 101° C. at a pressure of 0.15 mm. of mercury. This product on analysis contains 10.5% of nitrogen, the calculated value for $C_{18}H_{34}N_2$ being 10.07%.

Bisaldimine from 1,8-p-menthanediamine and trimethylacetaldehyde.—The above procedure is repeated using 9.9 parts of 1,8-p-menthane diamine, 26 parts of toluene and 10 parts of trimethylacetaldehyde. The bisaldimine obtained boils between 100 and 103° C. at a pressure of 0.25 mm. of mercury and contains 9.1% of nitrogen, the calculated value for $C_{20}H_{38}N_2$ being 9.15%.

Bisaldimine from hexamethylenediamine and trimethylacetaldehyde.—By a similar procedure to that described above using hexamethylene diamine instead of 1,8-p-menthane diamine there is obtained the bisaldimine of hexamethylene diamine and trimethylacetaldehyde, boiling between 94 and 96° C. at a pressure of 0.25 mm. of mercury, and containing 11.3% of nitrogen, the calculated value for $C_{16}H_{32}N_2$ being 11.11%.

Bisketimine from m-xylylenediamine and t-butylmethylketone.—18 parts of t-butyl methylketone are added with stirring to 11.1 parts of m-xylylenediamine in 22 parts of benzene and the mixture heated at the boil for 3 hours during which time the water formed in the reaction is removed as its azeotrope with benzene. The mixture is then distilled to give benzene and, boiling between 151 and 152° C. at a pressure of 0.6 mm. of mercury, the bisketimine from m-xylylenediamine and t-butylmethylketone, equivalent weight by titration with hydrochloric acid 150.5, theoretical equivalent weight 150.

Bisketimine from hexamethylenediamine and t-butylmethylketone.—By a similar procedure to that described above using hexamethylenediamine instead of m-xylylenediamine there is obtained a bisketimine boiling between 107 and 109° C. at a pressure of 0.28 mm. of mercury and having an equivalent weight of 144.5, the theoretical equivalent weight being 140.

We claim:

1. A process for the manufacture of isocyanate-based polymers which comprises interacting at least one organic polyisocyanate and water in the presence of a member of the group consisting of sterically hindered bisaldimines obtained by reacting an aldehyde with an amine having two primary amino groups the amine or aldehydes being sterically hindered and sterically hindered bisketimines obtained by reacting a ketone with an amine having two primary amino groups the amine or ketone being sterically hindered, sterically hindered amines aldehydes and ketones being amines, aldehydes and ketones which contain amino or carbonyl groups respectively attached directly to a carbon atom which in turn is attached to three other carbon atoms.

2. A process as claimed in claim 1 wherein the sterically hindered bisaldimine is derived from a sterically hindered amine.

3. A process as claimed in claim 1 wherein the sterically hindered bisaldimine is derived from a sterically hindered aldehyde.

4. A process as claimed in claim 1 wherein the sterically hindered bisketimine is derived from a sterically hindered amine.

5. A process as claimed in claim 1 wherein the sterically hindered bisketimine is derived from a sterically hindered ketone.

6. A process as claimed in claim 1 wherein the organic polyisocyanate is an isocyanate-ended prepolymer.

7. A process as claimed in claim 6 wherein the prepolymer is obtained by the interaction of an excess of a polyisocyanate with a polyester.

8. A process as claimed in claim 7 wherein the polyester has a molecular weight between 250 and 2000.

9. A process as claimed in claim 1 wherein the amount of sterically hindered bisaldimine or sterically hindered bisketimine is such that one aldimine or ketimine group is present for each isocyanate group.

10. A process as claimed in claim 1 wherein the amine is an aliphatic or cycloaliphatic amine.

11. A process as claimed in claim 1 wherein the sterically hindered bisaldimine or sterically hindered bisketimine contains a group reactive to isocyanate groups.

References Cited

UNITED STATES PATENTS

| | | | |
|---|---|---|---|
| 2,912,414 | 11/1959 | Schultheis et al. | 260—75 |
| 3,420,800 | 1/1969 | Haggis | 260—75 |

HOSEA E. TAYLOR, Primary Examiner

M. J. WELSH, Assistant Examiner

U.S. Cl. X.R.

260—2.5; 77.5